United States Patent
Jonsson et al.

(10) Patent No.: US 6,634,183 B1
(45) Date of Patent: Oct. 21, 2003

(54) CHEMICAL HEAT PUMP

(75) Inventors: Staffan Jonsson, Karlskoga (SE); Ray Olsson, Hammarland (FI); Mona Karebring-Olsson, Hammarland (FI)

(73) Assignee: Solsam Sunergy AB, Stockholm (SE)

( * ) Notice: Subject to any disclaimer, the term of this patent is extended or adjusted under 35 U.S.C. 154(b) by 0 days.

(21) Appl. No.: 09/868,326

(22) PCT Filed: Dec. 20, 1999

(86) PCT No.: PCT/SE99/02432
§ 371 (c)(1),
(2), (4) Date: Dec. 5, 2001

(87) PCT Pub. No.: WO00/37864
PCT Pub. Date: Jun. 29, 2000

(30) Foreign Application Priority Data

Dec. 18, 1998 (SE) .............................................. 9804444

(51) Int. Cl.⁷ ................................................ F25B 15/00
(52) U.S. Cl. ........................... 62/476; 62/480; 62/324.1
(58) Field of Search ..................... 62/476, 478, 480, 62/482, 484, 324.1, 235.1; 165/104.12

(56) References Cited

U.S. PATENT DOCUMENTS

| | | |
|---|---|---|
| 925,039 A | 6/1909 | Seay |
| 4,183,227 A | 1/1980 | Bouvin et al. |
| 4,383,576 A | 5/1983 | Bricard et al. |
| 4,532,778 A * | 8/1985 | Clark et al. .................... 62/477 |
| 4,694,659 A | 9/1987 | Shelton |
| 4,873,842 A * | 10/1989 | Payre et al. ................... 62/480 |
| 5,056,591 A * | 10/1991 | Spinner et al. ......... 165/104.16 |

FOREIGN PATENT DOCUMENTS

| | | |
|---|---|---|
| DE | 3029068 A1 | 2/1982 |
| WO | 8101458 A1 | 5/1981 |

* cited by examiner

Primary Examiner—Melvin Jones
(74) Attorney, Agent, or Firm—Birch, Stewart, Kolasch & Birch, LLP

(57) ABSTRACT

In a chemical heat pump a substance is used which within the temperature range for which the heat pump is intended has a transition between a solid phase and a solution phase. The substance can for a solar driven chemical heat pump comprise magnesium chloride hexahdrate. In an accumulator part of the heat pump a heat exchanger (21) is provided enclosed by a net (23). The solid phase is primary located inside the net in contact with the heat exchanger while the solution phase flow out of the net and is collected in space (24') below the heat exchanger. From this space the solution phase is pumped and sprayed over the heat exchanger from a spray bar (25). Thereby, all the time equilibrium is maintained. The advantage including the constant temperature step and the relatively large energy content of solid substance is thereby combined with the high power of liquid substances. Such a chemical heat pump is among other things suitable for converting low grade heat energy such as solar energy to cooling and in some cases also for a simultaneous production of heat.

20 Claims, 8 Drawing Sheets

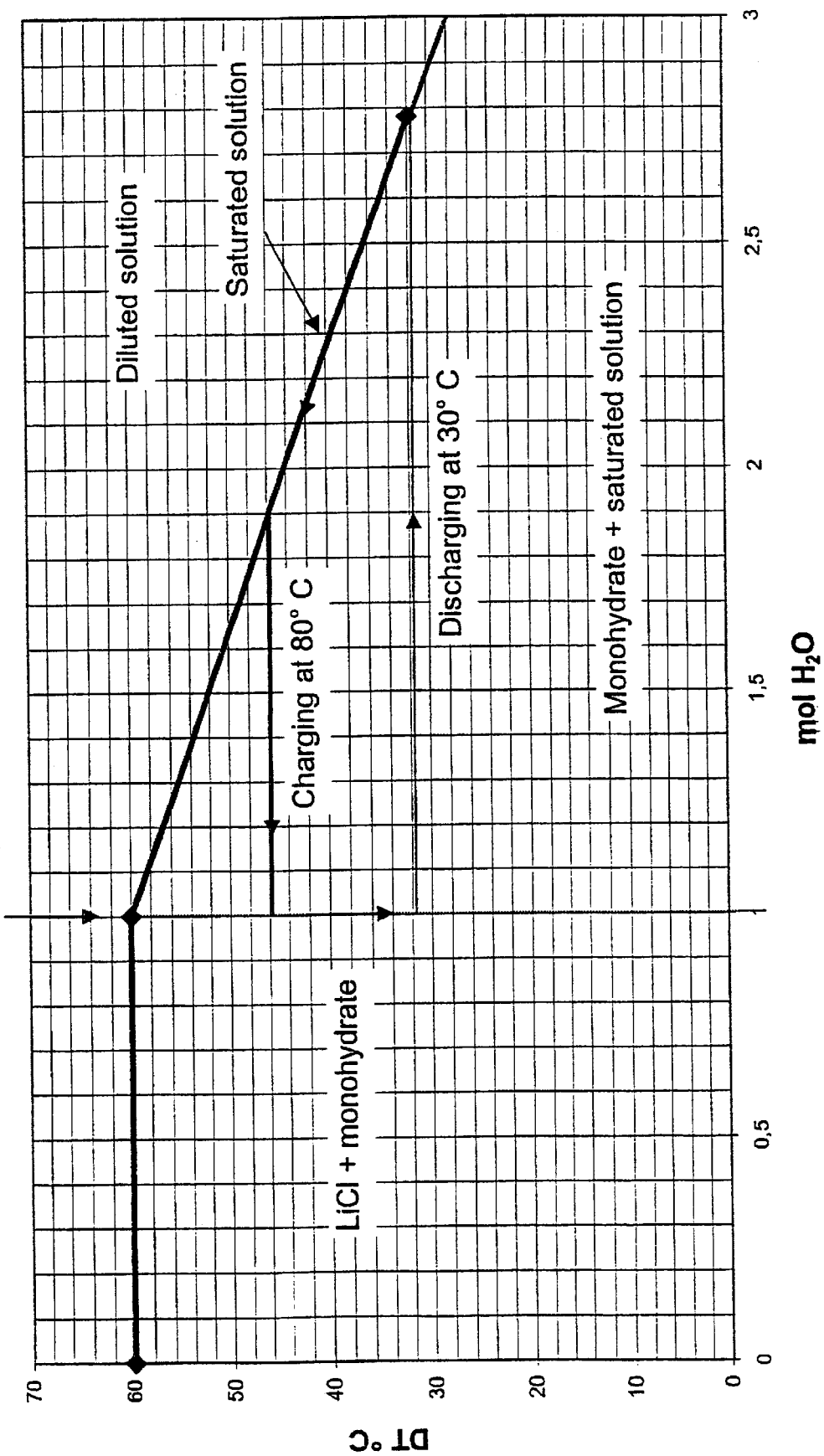

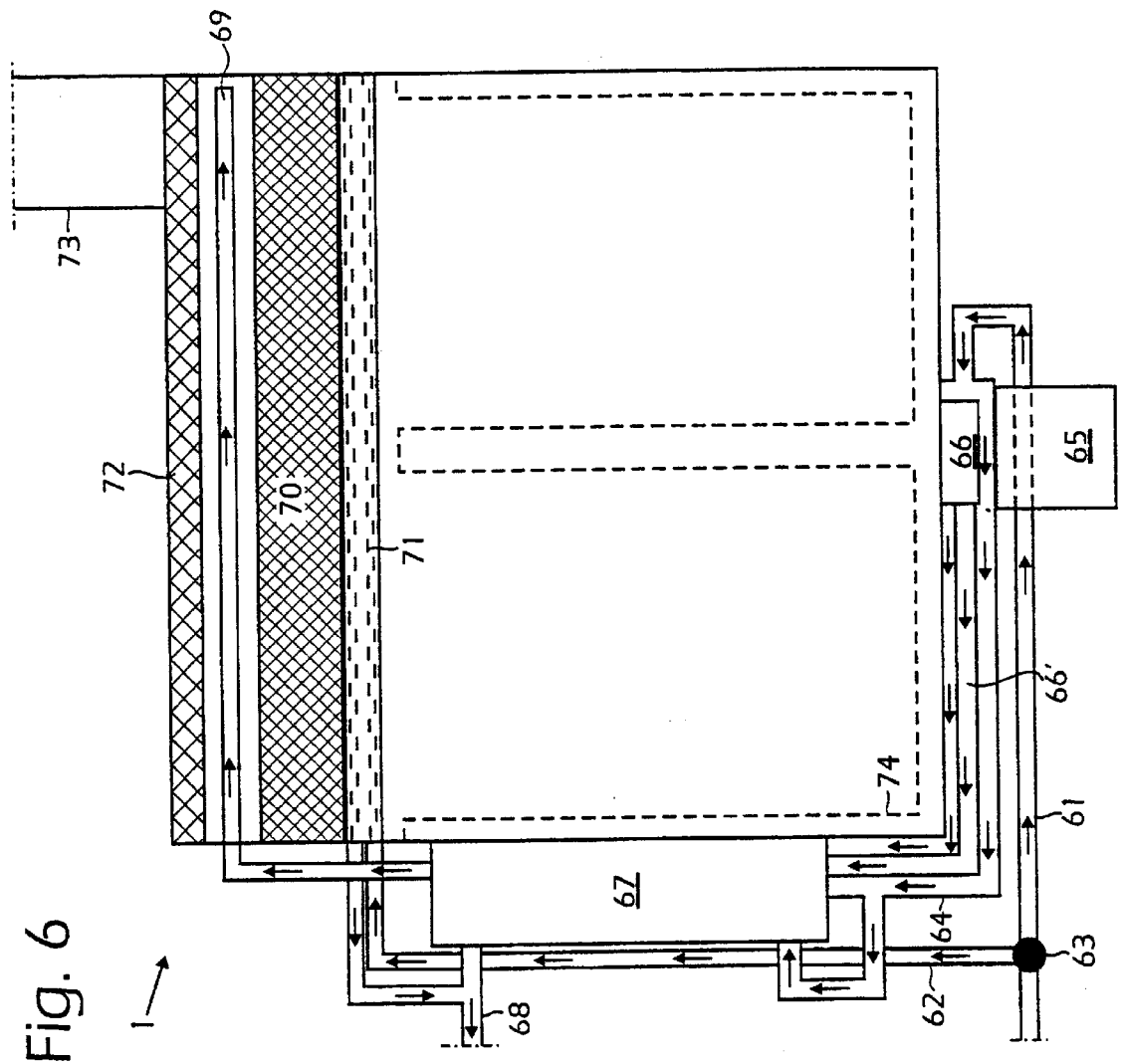

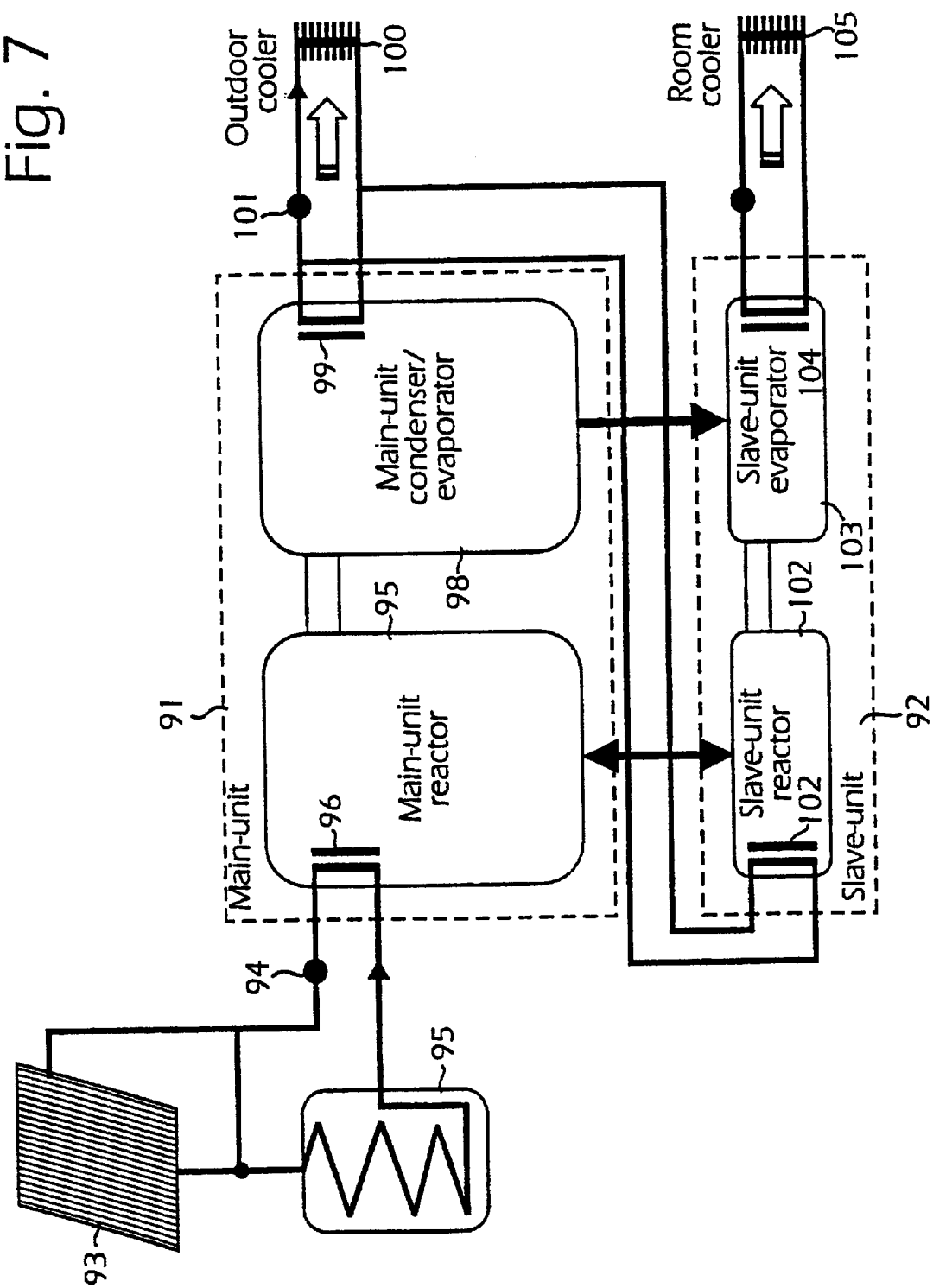

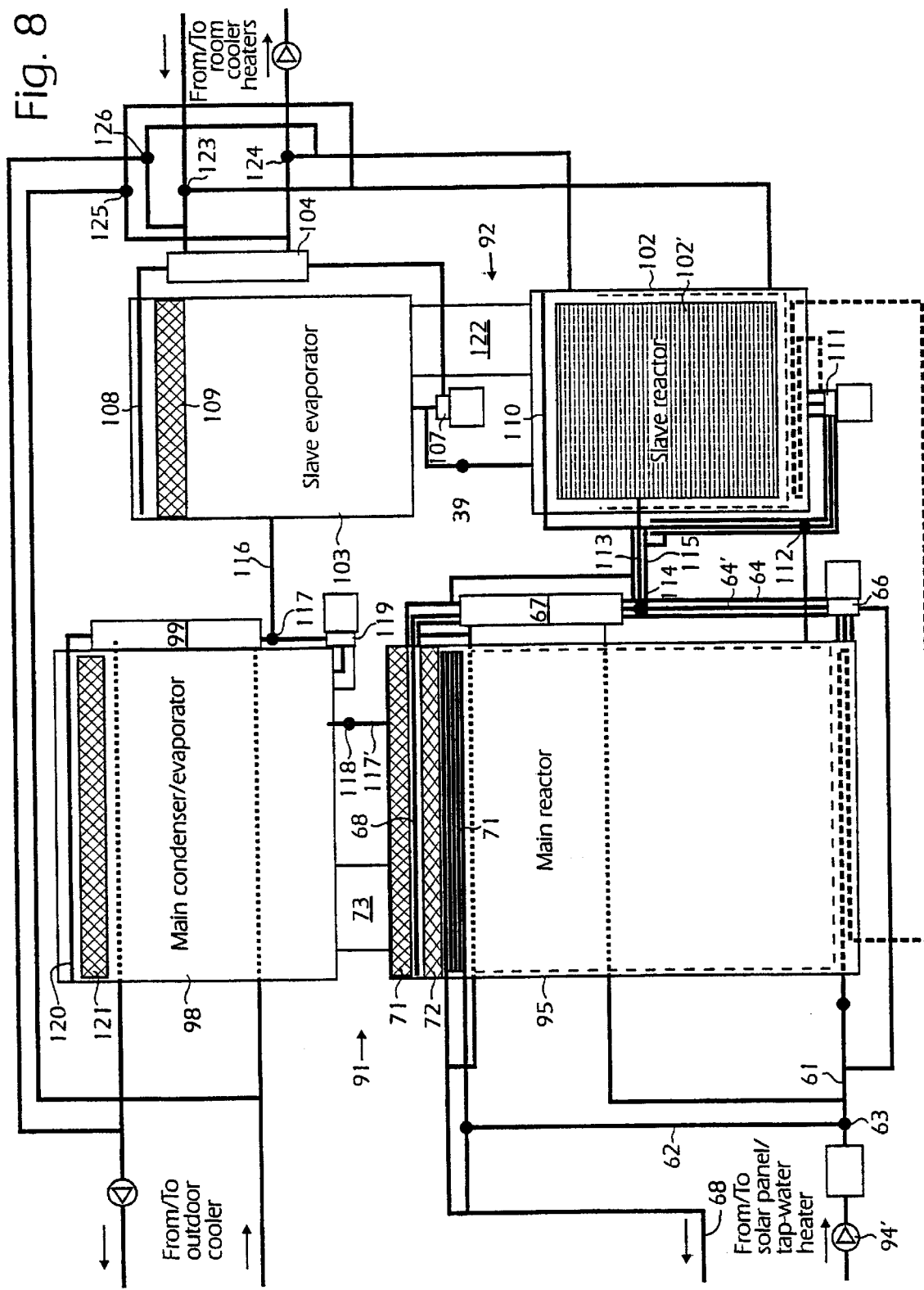

CHEMICAL HEAT PUMP

This application is the national phase under 35 U.S.C. § 371 of PCT International Application No. PCT/SE99/02432 which has an International filing date of Dec. 20, 1999, which designated the United States of America and was published in English.

TECHNICAL FIELD

The present invention relates to a chemical heat pump.

BACKGROUND

The principle of the operation of the chemical heat pump is well-known, see for example U.S. Pat. Nos. 5,440,889, 5,056,591, 4,993,239, 4,754,805 and the published International patent application WO 94/21973. In a chemical heat pump an active substance, the absorbent, is used which performs the very process of the heat pump and which works together with a volatile medium, the absorbate or sorbate, which usually is a dipolar liquid, in most cases water. As the working active substance, according to the known technology, either a solid substance or a liquid substance can be used. A solid substance has the advantages that the vapor pressure remains constant during the whole discharging process for a constant cooling temperature and a relatively large capacity of storing heat. A typical value of the storage capacity for a solid substance having water as the sorbate, counted as cooling energy, is about 0.3 kWh/1 substance. A further advantage associated with a solid substance is that no movable components are required in the system. Heat is transferred to or conducted away from the substance through a lamellar heat exchanger or a plate heat exchanger in a homogenous contact with the substance. The disadvantage associated with a solid substance is the limited power which can be obtained, due to the bad thermal conductivity of solid substances. For systems the charging time of which corresponds to for example six hours of daytime charging using solar energy and the discharging time of which corresponds to a period of twelve hours of cooling for example a building, this provides no major problem. However, a disadvantage is that for continuous cooling at day and night and based on solar energy two installations working in parallel with each other are required.

A liquid substance has the advantage of a high power since the substance can be spread over the heat exchanger both in charging and in discharging and thereby be efficiently cooled or heated respectively. The disadvantage of a liquid substance is that the cooling capacity decreases as a function of the dilution of the sorbate. This actually strongly limits the operational interval within which the substance can be used, what in turn reduces the storage capacity, counted as above as cooling energy per liter substance. Most liquid substances or absorbent used in chemical heat pumps comprise solutions of strongly hygroscopical inorganic salts in preferably water together with which water is used as the volatile liquid, the sorbate. Then another limitation is obtained by the fact that the dissolved substance cannot be allowed to crystallize. Crystallization creates problems in spray nozzles and pumps. Thus, the use of a liquid substance is limited to converting heat energy to cooling without any storing of heat and systems therefor are generally known and utilized. In such a process e.g. a lithium bromide solution can be used which when heated is evaporated to pass from a diluted solution to a more concentrated solution. This can be made in a chemical heat pump at a low pressure or at atmospheric pressure using air flows. The amount of working substance is relatively small, since no storing of "charged" concentrated solution is made. The hot concentrated solution is then cooled and is then again made to absorb the sorbate which is evaporated from a heat exchanger, the heat of which is taken from for example the rooms to be cooled. Disadvantages of this known system can be that the hot concentrated solution has to be continuously cooled what practically can result in energy losses and that no cooling can be obtained during the time period when there is no supply of heat. Thus, such a system cannot perform air-conditioning at night.

In U.S. Pat. No. 925,039 for William W. Seay a process of refrigeration is disclosed. Ammonia is in an absorber/generator tank absorbed by a solid salt, a thiocyanate of ammonium or of an alkali metal, to form a solution, the tank being cooled by cold water passing through a heat exchanger. In the absorbtion the dissolving of ammonia is an endothermal process, requiring or consuming energy, for which all of the latent heat of evaporation/condensation of the ammonia gas is used. This reduces the external cooling power required in the absorption process compared to processes in which the dissolving instead liberates energy, the latter case being advantageous when the process is also intended for heat generation. The solution is then heated by passing hot water through the heat exchanger. The ammonia is liberated from the solution, passes through another heat exchanger to be cooled thereby and condenses in a receiver tank. After most of the ammonia has condensed, valves are opened to let it expand and pass through a third heat exchanger or refrigerator element from which heat is drawn by the ammonia gas when it expands. The expanded gas then passes to the absorber/generator tank to start a new cycle.

SUMMARY

It is an object of the invention to provide a chemical heat pump which can be driven by solar energy.

It is another object of the invention to provide a chemical heat pump in which advantages associated with a solid substance system are combined with advantages of a liquid substance system.

It is another object of the invention to provide a chemical heat pump in which efficient exchanging of heat between a liquid phase and a heat exchanger is obtained.

In a system using a solid substance which also after absorbing the volatile liquid remains solid a constant reaction pressure of the volatile liquid is maintained for a constant temperature of the substance when is absorbs vapor of the volatile liquid. The reaction pressure remains constant until all of the substance has been transferred from the first solid phase to the second solid phase. For a system, as suggested in the cited U.S. patent, which has a substance selected so that when in the discharging process vapor is absorbed by the substance the first phase is solid and the second phase is liquid, a solution phase, similarly a constant reaction pressure of the sorbate is maintained for a constant reaction temperature. The substance is then successively converted from a solid state to a liquid state. The process continues at a constant reaction pressure until all of the substance has been transferred to a liquid state. In the same way the reaction pressure in the last portion of the charging process is constant for a constant temperature when the substance is being converted from a liquid to a solid shape and vapor is liberated from the solution. In the first portion of the charging process the solution phase is only heated and no vapor is liberated. Thus, for such a heat pump using a phase transition between solid and liquid states advantages of a solid substance system can be combined with advantages of a liquid substance system.

When discharging the substance, i.e. when it absorbs the volatile liquid, the substance is made to be more and more dissolved in a somewhat diluted solution of the substance in the volatile liquid which exists in its vapor state around the solid and liquid phases. Thus, the produced solution is made to trickle over and through the remaining solid substance and is then passed through a filter or net to be separated from the solid substance. The solution which now becomes saturated then liberates heat produced both in the condensation of the vapor and in dissolving the vapor in the substance to a heat exchanger which is cooled by e.g. the outdoor air. This can be achieved by having a pump make the solution pass over a heat exchanger. The solution is then spread or distributed on some surface enlarging means in order to again participate in the absorbtion of vapor. The surface enlarging means can comprise balls, rods, nets, fibers made from some suitable material. The heat exchanger and the surface enlarging means can be combined in one unit.

Thus, in the process a three-phase system is used, in which vapor, a solid active substance and the saturated solution of the active substance simultaneously exist. In the discharging step these three components exist all the time. Thereby, for a constant temperature a constant vapor pressure is maintained. Thus, when starting the process, the major portion of the substance exists in its solid state. A minor portion exists in the saturated solution of the substance. In the discharging process the proportion between the amount of solid substance and the amount of solution is changed so that, at the end of the process, the major portion of the substance exists in the saturated solution. As long as a single crystal of the solid substance remains in the reactor, the three-phase rule is fulfilled and thereby the vapor pressure is constant for a constant temperature. Furthermore, the installation is designed to separate solid substance and saturated solution from each other before passing the pump and before passing the heat exchanging step. Thus, the exchanging of heat is performed completely in the liquid phase and thereby the exchanging of heat will be efficient. No melting of the substance is used. The efficiency of the process is determined by the capacity of the heat exchanger and the reaction between the saturated solution and the vapor which is turn depends on the size of the exposed area of the saturated solution and on the pressure drops in the system.

In the charging process, in the corresponding way, the three-phase system has to be considered. Both vapor, solid substance and saturated solution may exist simultaneously. The charging involves that the proportion of solid substance and saturated solution is changed towards more solid substance. When all three components or phases exist at the same time, in the same way as in discharging, the vapor pressure is constant provided that the temperature is constant. Saturated solution and particles of the solid substance are separated from each other by means of the net or filter and exchange of heat is made in the solution phase. The solution is distributed over a large area to liberate vapor of the volatile liquid.

Thus, the process in charging is completely reversible and uses the same basic setup as in discharging. However, it should be observed that in the charging process, owing to the higher temperature, the substance, which in the beginning of the charging exists almost completely in the solution phase, remains in the solution during part of the charging process since the solubility of the substances increases with temperature and then the system has only two phases. At some time in the charging process portions of the solution starts to be converted to solid substance and then the system again has three-phases. The different solubility at different temperatures means that in a way a small climb upwards on the temperature scale is made which obviously is necessary to increase the vapor pressure so that it is higher than in the condenser.

Making the saturated solution gradually crystallize and thereby obtaining a constant vapor pressure for a given temperature facilitates the charging process since it is then no longer necessary to increase the temperature of the reaction after a crystallization has started. Instead, if the substance, as in a normal absorption refrigeration process, had remained in a liquid state, the final charging temperature would have become as high as above 130° C. for typical salt/water systems whereas, as used herein, it can be maintained well below 100° C., often in the range of 70–85° C.

In conventional absorption refrigeration systems, which for instance could employ a solution of LiBr, a crystallization must be avoided for process technical reasons. In such processes the volatile liquid—water—in the solution can be liberated only if the temperature is allowed to rise highly above 100° C. This is the basic problem encountered when obtaining refrigeration from solar driven cooling installations using absorption processes. The solution to this problem is to allow, during the step of increasing temperature, the water vapor to be freely emitted thereby leaving crystals of the solid substance—hydrate. When this occurs, i.e. when crystals start to be formed, the three-phase state is entered. The temperature then remains constant and at a significantly lower value than that of the corresponding absorption refrigeration process using a non-crystallizing solution (a liquid substance system). At this significantly lower temperature charging using solar energy is much more favorable and can be achieved without using costly, concentrating vacuum solar panels. In addition, an advantage is obtained by the solid substance—the hydrated salt—constituting a buffer which can be used for storing heat.

Similarly, it is quite possible to use, at the same time as the charging takes place, the saturated solution existing in the system for an absorption refrigeration process, i.e. refrigeration can be performed at day-time while the charging is made accumulating solid substance for future needs when the sun does not shine.

Generally the active substance must have the following property: It should at a first lower temperature have a solid state from which it, when absorbing the volatile liquid and in most cases the vapor phase thereof, directly passes partially to a liquid phase or a solution phase and at a second higher temperature it should have a liquid state or exist in a solution phase from which when emitting the volatile liquid which then is transferred to vapor it directly partially passes to a solid state. Preferred active substances working together with water vapor typically include various metal salts which in the solid state contain crystal water. Among these preferably magnesium chloride can be mentioned but also magnesium bromide and lithium chloride and some other salts can work well.

The vapor pressure of the volatile liquid should preferably be so low (which is equivalent to the condition that the quantity $\Delta T$ defined below should be so large) that a sufficiently low cooling temperature is obtained. Further, the energy content in the reaction of the solid substance and the vapor should be sufficiently high in order to of interest in the intended applications, i.e. the solid substance should absorb a sufficient amount of water per final volume of the solution.

A solid substance being a mixture of salts can also be used, provided that it fulfils the requirements discussed above. An example of such a mixture is the dihydrate of calcium chloride mixed with a minor portion, say about 10% (weight), of lithium chloride.

In order to obtain a continuous operation of the heat pump, the various process steps can be made in separate spaces. Thus, a first space can be used for only charging the substance, i.e. heating a solution phase of the substance to produce solid substance and/or a saturated solution, a second space can be used only for condensing the vapor, a third space only for discharging, i.e. for making a saturated solution and solid substance absorb vapor, and a fourth space only for evaporating. Gas conduits are arranged so that the vapor can move freely between the first and second spaces and between the third and fourth spaces. Conduits and pumps are provided for transferring solution and volatile liquid between the first and second space and between the second and fourth spaces respectively.

BRIEF DESCRIPTION OF THE DRAWINGS

The invention will now be described by way of non-limiting embodiments with reference to the accompanying drawings in which FIG. 5 is a reaction diagram showing the characteristic temperature difference as a function of temperature of a reaction system including LiCl, the monohydrate of LiCl and water, FIG. 6 is a schematic elevation view of another embodiment of the absorption side of a chemical heat pump, FIG. 7 is a schematic diagram illustrating an installation comprising a thermo-chemical accumulator, and FIG. 8 is a schematic elevational view of the thermo-chemical accumulator of FIG. 7.

DETAILED DESCRIPTION

Figure 1:
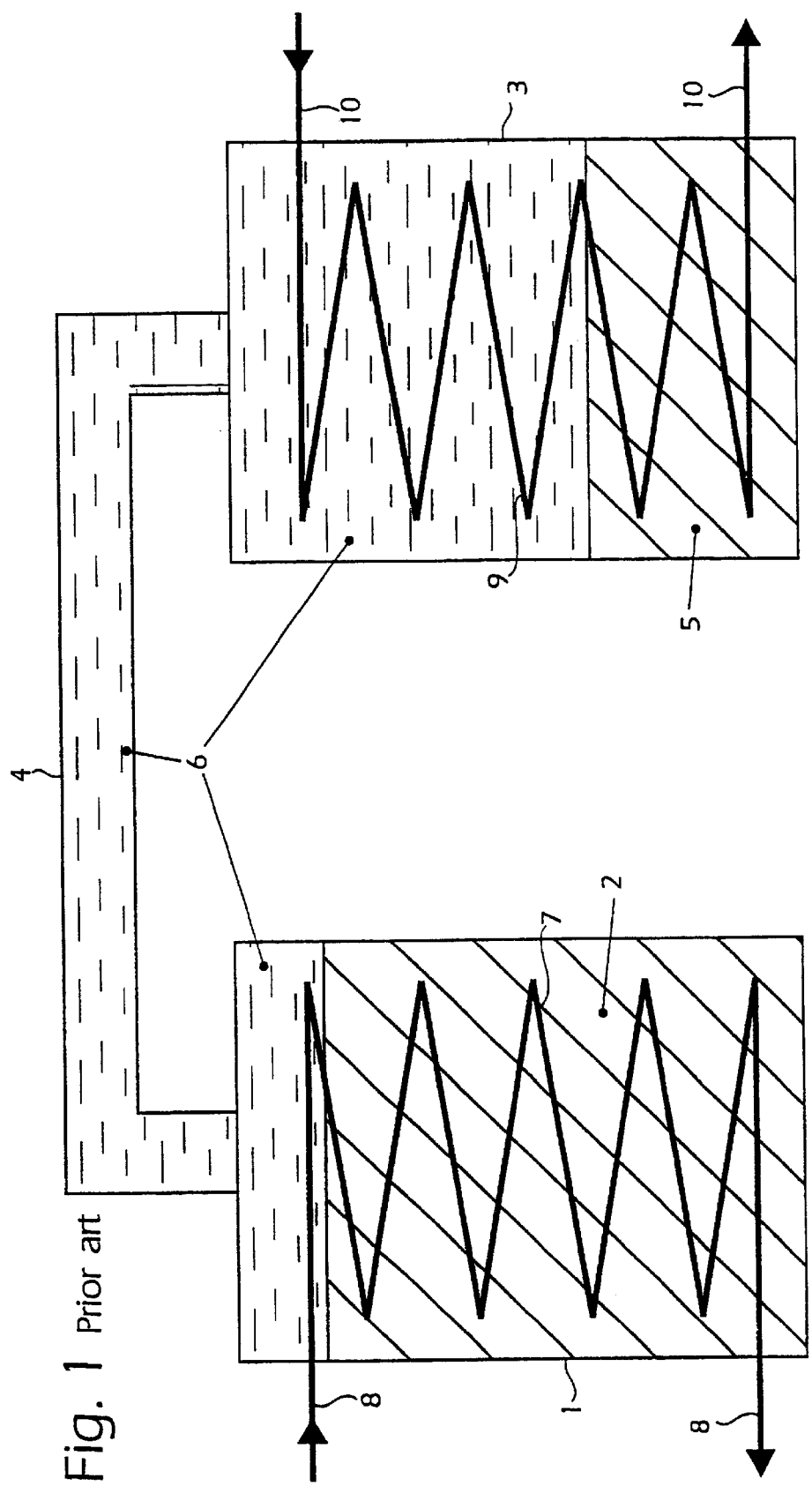
FIG. 1 is a schematic picture of a chemical heat pump.

In FIG. 1 a chemical heat pump for production of cooling or heating is schematically shown. The chemical heat pump shown has a first container 1 or accumulator, also called absorber/generator, containing a substance 2, the absorbent, which can exothermally absorb and endothermally desorb a sorbate, usually water. The first container 1 is connected to a second container 3, also called condenser/evaporator, through a fixed gas connection 4 having the shape of a pipe connected at its ends to the top sides of the containers. The second container 3 acts as a condenser for condensing gaseous sorbate 6 to liquid sorbate 5 when the substance 2 in the first container 1 endothermally desorbs the sorbate and as an evaporator of liquid sorbate 5 to gaseous sorbate 6 when the substance 2 in the first container 1 exothermally absorbs sorbate.

The system, i.e. the inner spaces in the first and second containers 1, 3 and the gas conduit 4 which are in fluid connection with each other is completely gas-tight and evacuated from all gases except the gas 16 which participates in the chemical process and usually is water vapour. The substance 2 in the accumulator 1 is in direct contact with a first heat exchanger 7 in the accumulator. The first heat exchanger can through a liquid flow 8 can receive heat from or provide heat to the environment. The liquid 5 in the evaporator/condenser part 3 is similarly is in direct contact with a second heat exchanger 9 in to the evaporator/condenser. Heat can be supplied from the second heat exchanger to the environment or from the environment to the second heat exchanger through a liquid flow 10.

The different components of the system can advantageously be arranged within a single exterior vessel, such as illustrated in the above cited U.S. Pat. No. 5,440,899 to De Beijer et al., so that the vessels 1 and 3 are formed by dividing the vessel by partitioning walls.

The substance 2 in the heat pump is here selected so that it at the temperatures for which the heat pump is intended can work with a transition between solid and liquid states. The reaction in the accumulator 1 thus occurs between a solid phase state and a liquid phase state of the substance 2. In a discharging process when the sorbate is absorbed by the substance the first phase is solid and the second phase is liquid and then a constant reaction pressure of the sorbate is maintained a constant temperature. The substance will then successively pass from a solid to a liquid state. The process continues at a constant reaction pressure for the constant temperature until all of the substance has passed from a solid to a liquid state. In the same way the reaction pressure is constant in that part of a charging process when the substance passes from a liquid to a solid state.

Figure 2:
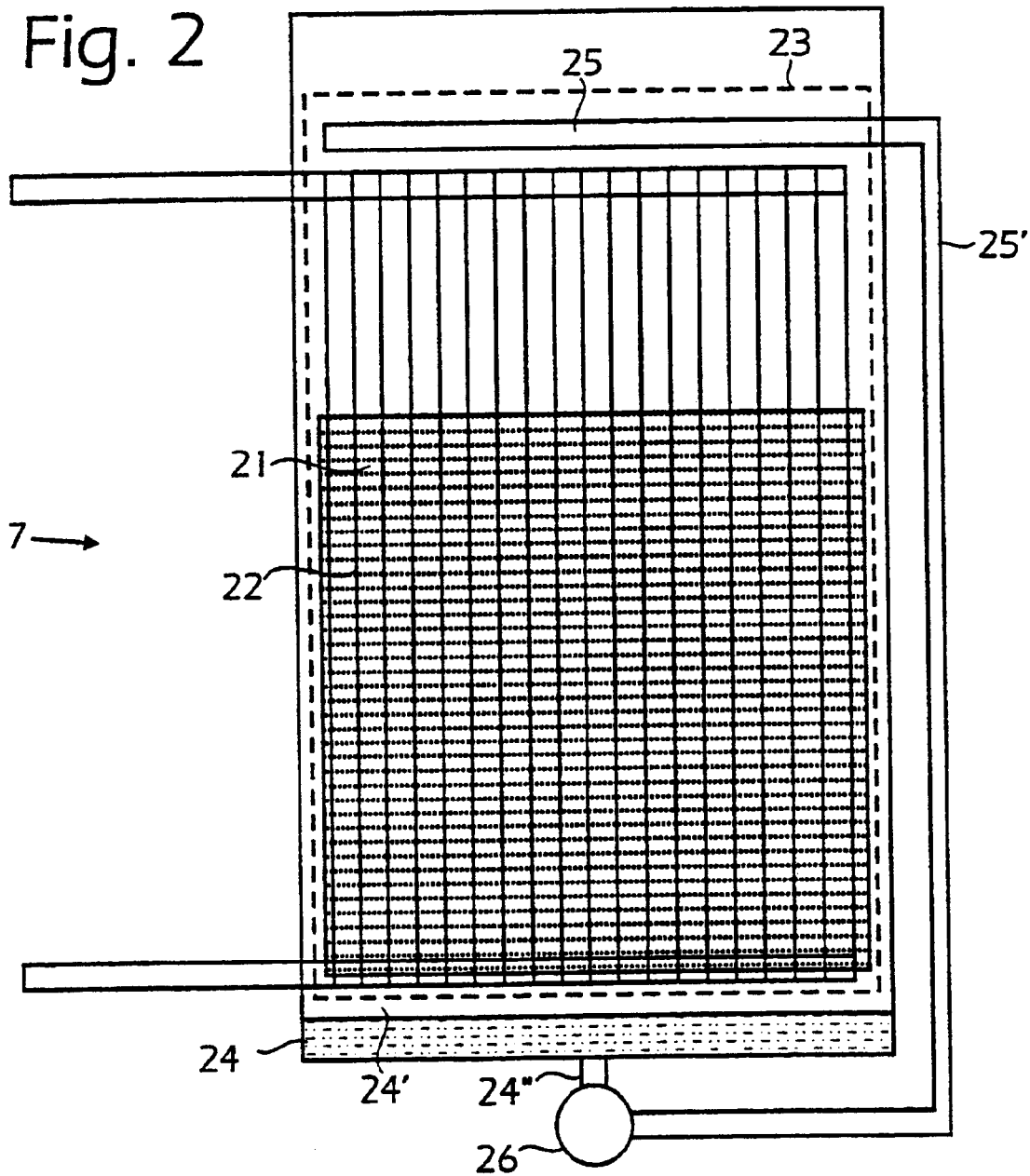
FIG. 2 is a schematic elevational view of the absorption side of a chemical heat pump.

In FIG. 2 an accumulator 1 is shown which is suitable for such a substance 2 which has a transition between solid and liquid states. The substance is in its solid form 21 placed at one of the surfaces of a heat exchanger 22 corresponding to the heat exchanger 7 of FIG. 1. The heat exchanger 22 is designed as a plate having for example surface enlarging vertical flanges on its front side where the solid substance 21 is located. The rear side of the heat exchanger 22 is in contact with an exterior medium which supplies heat or transports heat away. Furthermore, the heat exchanger 22 together with the solid form 21 of the substance is in all directions completely enclosed by a close-meshed net 23, through which only very small particles can pass and through which liquid and gas can freely pass. Solution 24 which forms the liquid state of substance is located at the bottom of the accumulator vessel 1 and is collected in a free space 24' directly underneath the heat exchanger 22. This space has an outlet 24" in connection with a pump 26. A liquid distribution system 25 is placed inside the net 23 above the heat exchanger 22 and is through a conduit 25' connected to a pump 26 so that the pump 26 can distribute solution over the heat exchanger 22. The liquid distribution system can be configured as a spray bar but it requires a rather high pressure and the small holes therein can easily be plugged by crystals formed. Instead, a rotating tube having large openings can be advantageously used.

The process in the accumulator part 1 having as an example the salt $MgCl_2.6H_2O$ for the solid substance will now be described and then in the "charging" step for example solar energy can be used. The substance 2 is assumed to be initially "charged" and will thus be "discharged". It then exists in its solid phase, placed at 21 in contact with the heat exchanger 22. The solid form 21 of the substance can exist as fine crystals or more or less sintered to a solid cake and can in any case not pass through the net 23. The heat exchanger 22 then has for example the ambient temperature, for example out-door temperature, such as about 30° C. and also the condensate 5 in the condenser 3 can have the same temperature. When water vapor is absorbed by the solid form 21 of the substance energy is developed in the accumulator 1 and its temperature could then be increased but normally the heat is transported, i.e. the substance is cooled by the medium flowing in heat exchanger 22. Energy is consumed for vaporizing inside the evaporator/condenser 3, the temperature of which is lowered and which thus, through the heat exchanger 9, can be used for for example cooling rooms in houses. The solid form 21 of the substance is then partially transformed to solution 24 which flows away from the heat exchanger 22 and out of the enclosing net basket. The solution 24 is collected in the free space 24' below the heat exchanger 2, from which space it by the pump 26 through the outlet 24" is transported to the distribution system 25 at the top side of the heat exchanger 22 where it is spread over the surface of the heat exchanger. The solution 24 will then trickle through the solid form 21 of the substance and is thus always saturated when it reaches the bottom of the accumulator and when it then by the distribution bar 25 is distributed over the top portion of the heat exchanger 22. The top portion of the heat exchanger 22 will soon be freed of solid substance 21 after which a good heat transfer and thereby a high efficiency of the absorbtion process can be obtained. This continues until substantially all of the solid form 21 has been converted to solution 24.

In "charging" the substance 2 it can in the initial state be assumed to exist as a solution 24. The heat exchanger 22 in the accumulator 1 is heated to a suitable temperature, for example at least 50° C. such as by means of solar energy, see the discussion hereinafter, while the evaporator/condenser is maintained at ambient, e.g. indoor or outdoor, temperature, i.e. at most at about 30° C. The solution 24 is from then on pumped around and spread over the now free heat exchanger 22. When the solution 24 is heated in contact with the heat exchanger the sorbate is released to the condenser 3 and the solution 24 is concentrated. However, the solubility of the substance 1 is considerably higher at high temperatures than at low temperatures and thus the charging can be driven to the solution phase in a high concentration.

The crystallization, i.e. the conversion of the substance to its solid state, then occurs spontaneously in the solution 24 and fine crystals are formed which grow until they cannot any longer pass through the net 23, whereafter they will be collected at the bottom portion of the heat exchanger 22. For a highest desired concentration, when thus the system is ready to be again discharged and used for cooling, the pump 26 is stopped and reversed, so that the remaining solution 24 in the space 24' is pressed into the space around the heat exchanger 22. At the same time the heat exchanger 22 is cooled to for example ambient, e.g. outdoor or indoor, temperature of about 30° C. and all the remaining substance 2 in liquid form 24 crystallizes. The system can now, in the discharging step, be used to cool rooms provided that the heat exchanger 9 in the evaporator/condenser 3 is placed in a room in a house or an apartment.

The walls of the heat exchanger 22 can advantageously be treated by for example Teflon to counteract that crystals are to a too high extent built thereon, so that instead crystals formed can move substantially freely inside the net 23. The level of the solution 24 in the heat exchanger 22 when all the solid form 21 of the substance has been transformed to the solution phase, is assumed to comprise at most about ⅔ of the height of the heat exchanger.

The chemical reactor thus described for a chemical heat pump is assumed to be combined with a condenser/evaporator part placed in the same container and not shown in FIG. 2. It is designed comprising plate heat exchangers of cylindrical or flat shape and is equipped with either capillary sucking material on at least part of the heat exchanger surface, or a distribution system and a pump in order to distribute such as by spraying and thereby wet the surfaces of the heat exchanger in the evaporation process.

An installation of the type described above is preferably designed so that the reactor is placed at the bottom and the condenser/evaporator at the top in order that overflow and splashes of the substance in its liquid phase will not be easily allowed to be transferred to the condenser/evaporator side. However, this can still occur because of the strong gas flow and thus a risk exists that the water in the evaporator/condenser part in time will obtain a too high concentration of the substance. To prevent this, after each discharging process when only a small amount of water remains in the evaporator, a valve, not shown, can be opened in the bottom of the evaporator, through which these last rests of water are allowed to freely flow down into the reactor. In that way an accumulation of substance in the condenser/evaporator part is avoided. This mechanically released water can advantageously be allowed to pass through the reactor pump to clean it. In the same way it is after a discharging process possible to allow pure water to be reversed backwards through the pump through the same valve to remove concentrated solution before the final cooling of the reactor/accumulator.

A somewhat different design of the reactor or absorber/generator 1 is shown in FIG. 6. In the charging stage hot water flows from a solar panel, not shown, through a suitably set valve 63 and a conduit 61 to a jacket 64 which encloses the pump 66 and a conduit 66' connecting the pump to one side of an outer heat exchanger 67. The hot water enters the other side of the outer heat exchanger 67 and continues therefrom through a conduit 68 back to the solar panel. The saturated solution flows propelled by the pump 66 driven by a pump motor 65 through said one side of the outer heat exchanger 67 to a distribution pipe 69, from which it is spread over surface enlarging means 70 arranged in the top portion of the space inside the reactor and further down over an inner heat exchanger 71, placed directly below the surface enlarging means but only having a small vertical extension and not being actively heated or cooled in this stage. At the top of the reactor a gas filter 72 is arranged and therethrough the vapor emitted from the saturated solution passes to a gas conduit 73 connected to the condenser, not shown in FIG. 6. In the evaporation crystals are formed which together with the remaining solution passes downwards at and past the inner heat exchanger 71 to the bottom of the filter or net basket 74, where they are collected, inside the basket. The saturated solution is collected at the bottom of the reactor, in a space below the bottom of the net 74.

The surface enlarging means can comprise Teflon balls having a diameter of 10 cm placed within a net structure at the top of the reactor space, below the top filter 72. In the illustrated embodiment, the risk of crystals being formed at non-desired places in the charging process is radically diminished, owing to primarily the flow of hot water around the pump and the conduit from the pump. Crystals can otherwise be produced in these devices, resulting in stops of the flow of saturated solution. Also, by using a closed outer heat exchanger 67 when heating the solution vapor cannot be formed and the risk of crystals being inside the heat exchanger is avoided.

In the discharging stage the inlet valve 63 is set so that a flow of cold water, from some heat sink such as water cooled by outdoor air, now passes only through a pipe 62 directly to the inner heat exchanger 71, thus by-passing the outer exchanger, and back through the outlet pipe 68, the outer heat exchanger 67 not being actively heated or cooled in the discharging process. The saturated solution is pumped through the inactive outer heat exchanger 67 or through a separate by-pass conduit, not shown, to the distribution pipe 69 and therefrom down the surface enlarging means 70. The solution then absorbs vapor what generates heat. This heat is transported away in the inner heat exchanger 71 after which the solution passes to the bottom of the net basket 74 to be there saturated again by contact with the remaining crystals. Then it passes through the basket and is again pumped to the top. The risk of crystals being unintentionally formed is small in the discharging stage since the solution and the crystals absorb water.

As the active substance working together with water a hydrate can be used. The substance should have a melting point exceeding all the temperatures existing in the process. When absorbing the volatile liquid, preferably the vapor thereof, the substance should converted to a saturated solution the vapor pressure of which is significantly lower than that of the volatile liquid itself. The vapor pressure should be so much lower that the charging temperatures used and the desired cooling temperatures fulfil the requirements for the particular use of the installation. Different uses may require different substances.

The substance used in the process, which as been mentioned above can for example be $MgCl_2.6H_2O$, magnesium chloride hexahydrate, should in its solid state immediately when absorbing the sorbate (water) be partially transformed to a liquid state. Magnesium chloride hexahydrate has a melting point above 100° C. but is immediately transformed to a solution, i.e. to liquid form, when more water is absorbed. The equilibrium pressure of the reaction hexahydrate to saturated solution is at a temperature of 20° C. about 4.6 mm Hg, which corresponds to a $\Delta T$ of 20° C. $\Delta T$ is here the temperature difference which at a pressure equilibrium exists between the three phases, i.e. solid substance, saturated solution and vapor, and the volatile liquid in the condenser/evaporator. A suitable $\Delta T$ for a solar driven system including water/water vapor as the sorbate is in the range of 20–40° C. The reaction is thus capable of cooling the sorbate in the evaporator in the discharging process to about 20° C. below the current temperature of the substance. For example, if the substance is maintained cooled in the discharging process to an outdoor temperature of 30° C., cooling water for room cooling can be produced at a temperature of 10° C. which is very suitable for air-conditioning systems. In the same way, in the charging process, if the condenser is maintained at an outdoor temperature of 30° C., the substance has to be only heated to a temperature exceeding (30+20)° C.=50° C.

The storage capacity in kWh cooling energy per liter substance primarily depends on the as solubility of the substance in the sorbate. One mole magnesium chloride hexahydrate absorbs 3.5 mole water at 30° C. to go into solution, which corresponds to about 0.25 kWh cooling energy per liter final solution. The energy content and the temperature difference $\Delta T$ varies considerably between different substances. The corresponding calculation for $LiCl.H_2O$, the monohydrate of lithium chloride, gives more than 0.3 kWh/l for a temperature difference $\Delta T$ of 32° C. The number of usable substances is limited. Suitable substances comprise LiCl, LiBr, LiI, $MgCl_2$, $MgBr_2$, $MgI_2$, $CaCl_2$, $CaBr_2$, $CaI_2$, $SrI_2$, KOH, NaOH, $ZnCl_2$, $ZnBr_2$, $ZnI_2$, $AlCl_3$, $AlBr_3$ and $AlI_3$ and among these $MgCl_2$, $MgBr_2$, LiCl, $CaCl_2$, $CaBr_2$, $ZnCl_2$ and NaOH can be considered as particularly suitable.

Also mixtures of salts can be employed. Thus, calcium chloride $CaCl_2$ forms four hydrates, a mono-, a di-, a tetra- and a hexahydrate. The hexahydrate is directly converted to a solution when it is exposed to water vapor. However, the energy difference $\Delta T$ is too small and the energy content is small. The hexahydrate melts already at about 30° C. and is thus unsuitable due to a too low melting point since the temperature in the discharging processes often is higher than 30° C. The substance is normally cooled by the outdoor air. The tetrahydrate absorbs water vapor and is then directly converted to a saturated solution, provided that the temperature is above 30° C. and that no crystals of the hexahydrate can be formed. The melting point of the tetrahydrate is about 45° C. However, the temperature difference $\Delta T$ and the energy content are too small.

However, if for example about 10% (weight) LiCl is mixed with the dihydrate, the melting points of all the hydrates are lowered. Both the hexahydrate and the tetrahydrate will then have melting points below the discharging temperatures considered herein. Then the process can be run using the dihydrate (doped with LiCl) as the start solid substance. The dihydrate then absorbs water vapor passing into a saturated solution. Now an energy difference $\Delta T$ equal to 26° C. for a substance temperature of 30° C. is obtained. The energy content counted as cooling energy is more than 0.3 kWh per liter final solution.

In a three-phase reaction of the type (solid substance)→ (solid substance+vapor) a constant reaction vapor pressure is maintained provided that the process occurs at a constant temperature. Furthermore, $\Delta T$ is fairly constant for different temperatures. This means that the vapor pressure of the reaction at different temperatures substantially follows the slope of the vapor pressure curve of the volatile liquid, i.e. in the preferred case water. $\Delta T$ represents the difference between the curves, i.e. for the same pressure over the water surface as over the reaction mixture the difference of the temperatures in the water and the reaction mixture must be $\Delta T$. This condition is rather constant irrespectively of the temperature level of the water and the substance.

Figure 3:
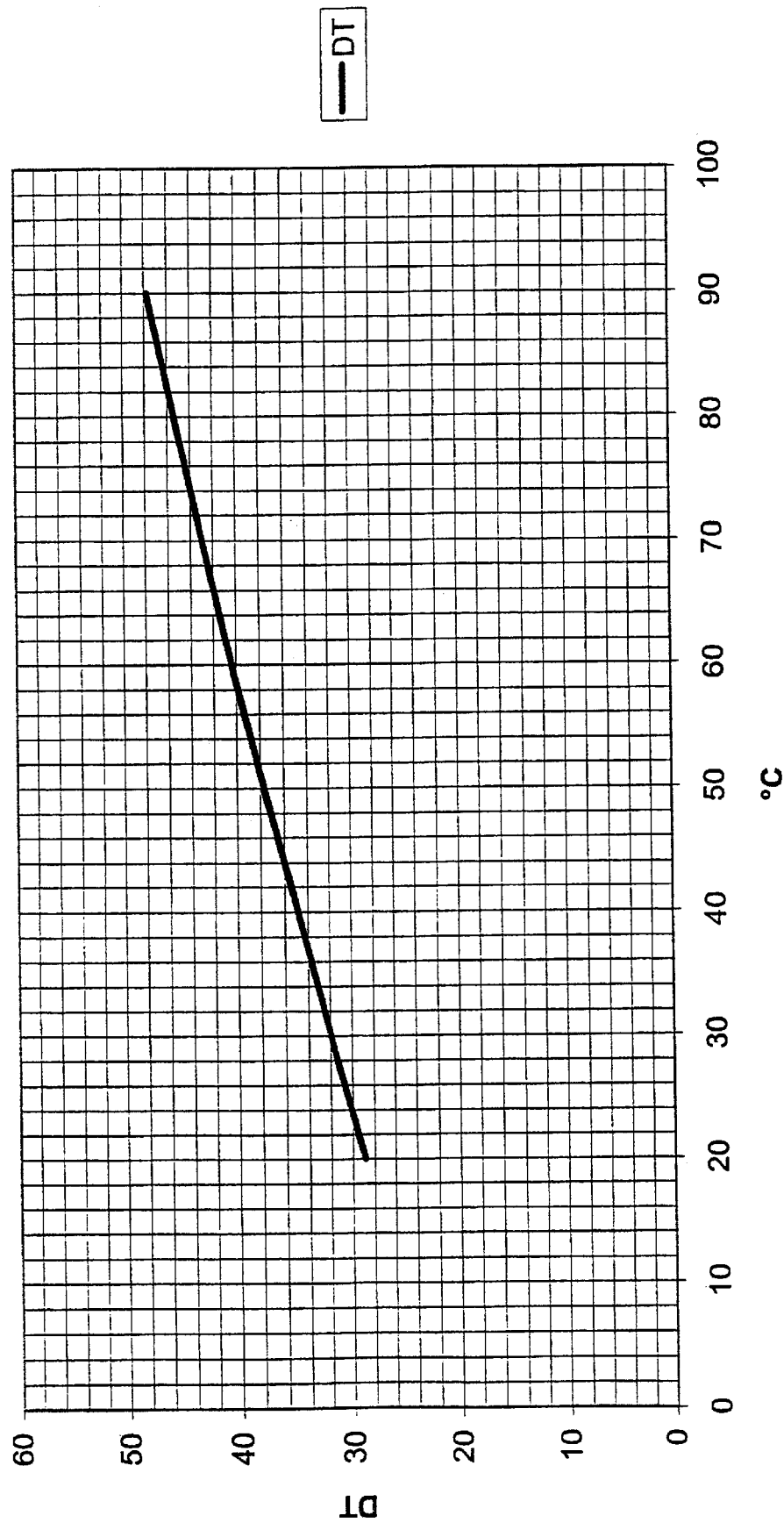
FIG. 3 is a diagram of a characteristic temperature difference as a function of the temperature of a saturated solution of LiCl in water.
Figure 4:
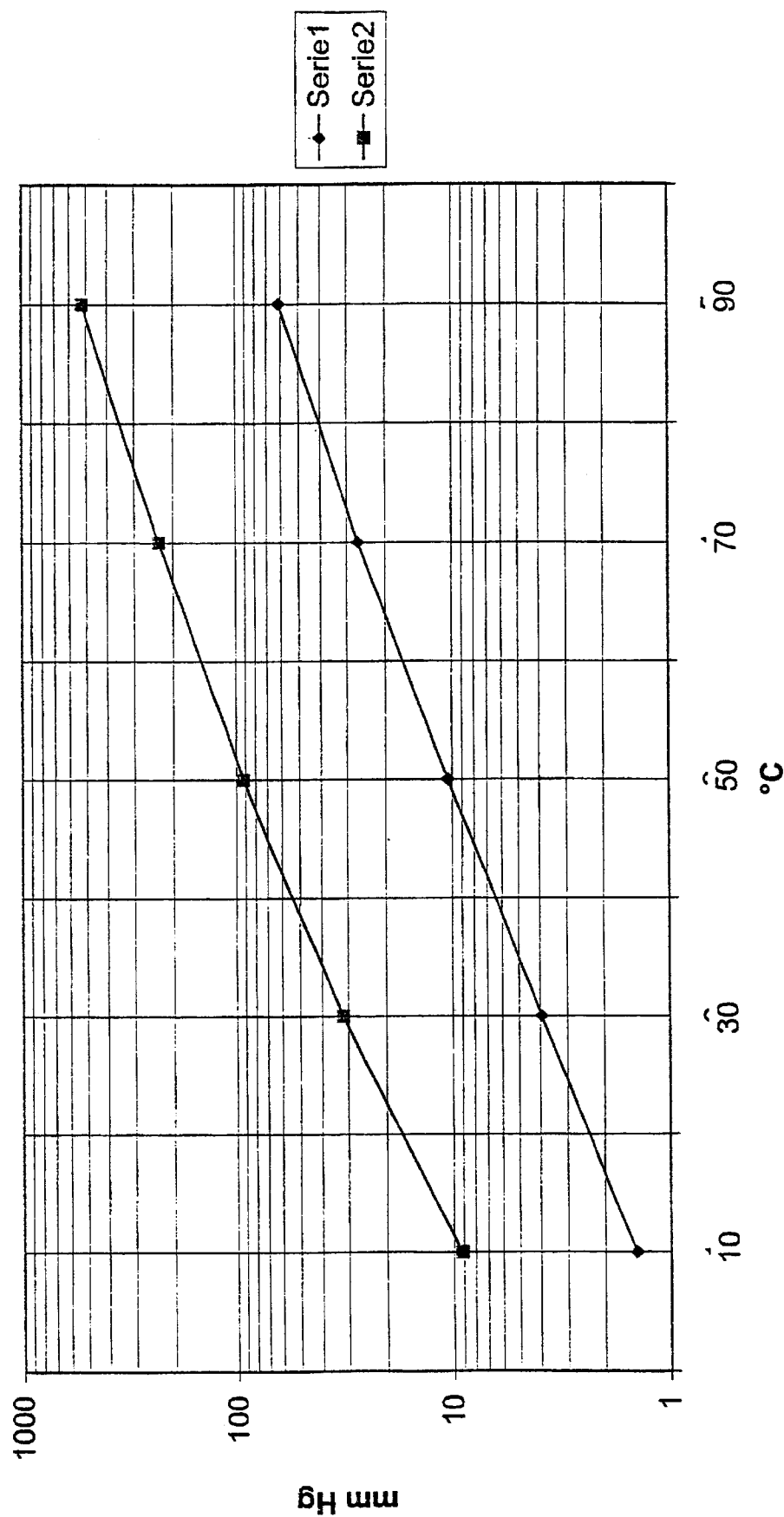
FIG. 4 is a logarithmic diagram showing in a lower curve the vapor pressure as a function of the temperature of the same solution as in FIG. 3 and showing in an upper curve the vapor pressure of water as a function of temperature.

The conditions in a three-phase reaction of the type considered herein (solid substance)→(saturated solution+ vapor) are a little more complicated. The phase component saturated solution is a variable parameter. Solutions saturated at different temperatures contain different concentrations of the dissolved substance. This results in that $\Delta T$ in charging at a first constant temperature differs from $\Delta T$ in discharging at second constant temperature. The variation of $\Delta T$ is for different temperatures of the reaction $LiCl.H_2O$→ ($LiCl.H_2O$+saturated solution of LiCl +water vapor) is illustrated by the diagram of FIG. 3. The corresponding vapor pressures are shown in a logarithmical diagram in FIG. 4, in which the lower curve is plotted for said reaction and the upper curve is plotted for $H_2O$. Thus, $\Delta T=32°$ C. for discharging when the substance is cooled to 30° C. For charging at 80° C. $\Delta T$ is more than 45° C. The consequence is that for charging, which for example with a constant $\Delta T$ equal to 32° C. could have been made a little above 62° C., for a condensation temperature of 30° C., now cannot be made below 75° C. However, a lower refrigerating temperature can be used, though the outdoor temperature is high.

For rough calculations, however, $\Delta T$ can in many cases be considered to be constant.

To describe the different phase states of the substance in charging and discharging as a function of substance temperature and $\Delta T$ a reaction diagram as illustrated in FIG. 5 can be helpful. The diagram relates to LiCl and shows at the horizontal axis moles $H_2O$ per mole LiCl and at the vertical axis ΔT. For 0 moles $H_2O$, at the left axis in the diagram, the state of dry LiCl is shown. In the range between 0 and 1 moles $H_2O$ dry LiCl mixed with the monohydrate is shown, where ΔT=60° C. The operating range of a heat pump as described herein is to the right of the vertical line 1 mole $H_2O$/mole LiCl. The reaction starts by discharging the solid monohydrate at a temperature of 30° C. The reaction follows the lower horizontal line to the right in the direction of the arrow. ΔT is then, as observed above, about 32° C. The reaction occurs at this line, as long all three phases exist simultaneously. At the end of the line the monohydrate has been consumed and all substance is in the saturated solution. Thus, the system is no longer a three-phase reaction and remains so when the charging is being started. Then the oblique line "saturated solution" upwards to the left is followed. When the saturated solution is being heated, the solubility of LiCl increases, i.e. the solubility increases with temperature. At the same time the ΔT of the solution increases as water vapour is liberated from the solution. At a given molarity the solution becomes supersaturated and crystals of the monohydrate start to be generated. The system then again works as a three-phase reaction and ΔT is in the example shown equal to 46° C. for a substance temperature of 80° C. By the system returning to a three-phase reaction, thus, the charging temperature is limited to a relatively low level. After all saturated solution has been converted to monohydrate, the substance can be cooled to 30° C. and the cycle is then repeated. The region between monohydrate and saturated solution represents in discharging a considerable cooling capability of about 0.3 kWh per liter final saturated solution.

The complete chemical heat pump according to the description above can as has been mentioned be used for converting solar energy to cooling for air-conditioning. If the need for cooling is only to be satisfied at daytime, two relatively small installations are combined which are driven intermittently. By the high power which every such installation provides the cycling times can be made very short. A suitable cycling time can be about one hour. Early in the morning one of the installations is charged for one hour, whereafter it is switched to the discharging phase and the air conditioning can start. During the time when this installation is discharged the other installation is charged. This procedure is then intermittently repeated during the whole day. For a contemplated complete double installation having the cooling power of 2 kW only between 10 and 20 liters of substance in the reactor is required and a space of about 10 liters of water in the condenser/evaporator part.

In order to obtain air conditioning also at night several technical solutions can be devised. For instance, a possibility of obtaining air-conditioning both at daytime and at night is to combine a small heat pump installation of the kind described above with a larger installation of the same kind which copes with the storage requirement for cooling at night. Another possibility is to only use a single, large installation of the kind described above which stores energy for cooling at night but, at the same time as the charging process, to divert a flow of saturated solution, cool the diverted solution separately and allow this solution to absorb water vapor from a similarly separate evaporator. In these cases the solar panel must be dimensioned to cope with a higher power since energy for cooling is taken out also at daytime. The energy should also be sufficient for charging the large installation for cooling during the coming night.

Thus, an installation comprising a thermo-chemical accumulator according to FIG. 6 and as illustrated by the schematic of FIG. 7 can provide cooling, heating and hot tap water all days of the year. In such an installation a main unit 91 is combined with at least one slave unit 92 to provide properties analogous to those of an electric accumulator. The main unit 91 in which the excess of charging heat from the solar panel is stored comprises a large installation of the kind described with reference to FIGS. 1, 2 or 6. It storage capacity is adapted to the energy consumption for comfort cooling, hot tap water or heating of the house during that part of the day when there is no sun-shine. The slave unit 92 is smaller than the main unit 81 and continuously produces cooling during the hot season and can produce heating during the cold season.

The function of such an installation having a single slave unit is as follows: At day-time heat from the solar panel 93 is transported carried by heated water which is propelled in closed loop by a pump 94 to firstly pass a tap-water heater 95 to heat the water therein and then to the heat exchanger 96 of the reactor 97 of the main unit. Condensing is made in the evaporator/condenser 98 of the main unit, the heat exchanger 99 of which is cooled by an outdoor cooler 100 using cooling water driven by a pump 101. At the same time and quite independently the reactor 102 of the slave unit 92 is discharged which reactor is also cooled by the heat exchanging water circulating from the outdoor cooler 100 to the heat exchanger 102' of the slave reactor. The evaporator 103 of the slave unit 92 issues water vapor to the slave reactor 102 and delivers comfort cooling through a heat exchanger 104 and room coolers 105. Whereas the main reactor 95 and the main condenser/evaporator 98 accommodate the major portion of the substance and the water for future storage needs, the slave unit 92 works with small quantities of the substance. Water is thus intermittently admitted to the slave evaporator 103 from the main evaporator 98, and discharged solution is provided from the slave reactor 92 to the main reactor 95 after which charged, hot saturated solution is again fed to the slave reactor 92 in which it is cooled, crystals being formed and both the crystals and the saturated solution absorbing vapor from the slave evaporator. The repetition period thereof can be about 10 minutes to 2 hours.

Thus, in the system of FIG. 7, the operating range of the substance is somewhat expanded compared to the process described in conjunction with FIG. 2. Also the saturated solution can thus absorb vapor, at least for some substances used. This presupposes that the saturated solution has a sufficiently low vapor pressure in order to obtain some efficiency in the absorption process. Some substances like $ZnCl_2$ have a too large ΔT in the solid-liquid reaction and can be better used only in the solution phase. The storage capacity is lower and ΔT is at a varying level but they can still work excellently in a thermo-chemical reactor as described herein.

The energy which is not consumed in producing cooling or hot tap water is stored in the main unit 91. When solar energy is not any longer available, the slave unit 92 continues working as before and then consumes stored energy. The main reactor 95 which is now not any longer being charged automatically proceeds to the discharging state after the equilibrium state of the system has been passed. This could occur at about 60° C. in summer. Thus, now heat for hot tap water is produced by the main reactor 96, the flow of heat exchanging water now only passing through the tap-water heater 95 and not through the solar panel 93 by setting a valve 106 accordingly, while the slave reactor 92 produces cooling.

The method of diverting small quantities of the charged substance and water to the slave units 92 results in that the main reactor 95 must not be converted, i.e. cooled to go into a stage of producing comfort cooling, since the cooling needed is provided by the slave units. The fact that the main reactor 95 instead is maintained in a hot state, in the discharging state (equilibrium state), reduces even further the risk of crystals being formed at non-intended places in the reactor. The main condenser/evaporator 98 continues to be cooled by the outdoor cooler. Generally the installation requires a minimum of valves for switching the flows.

The slave units 92 work in only one direction, i.e. in a discharging state, which is the most favorable one in regard of non-desired crystal formation. In the winter the main unit 91 operates in the way described and is at equilibrium at night, the equilibrium temperature being about 35 to 40° C. This will preheat the tap-water at night, the tap-water being heated to a higher temperature by means of an electric resistance heater, not shown. In the cold season the heat exchangers 102' and 104 of the slave units have an inverse connection compared to that shown in FIG. 7, this connection not being shown. Thus, the outdoor cooler 100 is then connected to the slave evaporator and the room coolers 105 which are now used for heating to the slave reactor. The slave units then produce water having a temperature also of 35 to 40° C. for heating the rooms using the room coolers 105.

In the total thermo-chemical heat accumulator of FIG. 7 different types of heat exchangers can be used, compare the outer plate heat exchanger 67 and the inner tube heat exchanger 70 of FIG. 6. Plate heat exchangers are used for all heat exchanging when the heat transporting medium is circulating water such as in charging in the reactors and in discharging in the evaporators. Then only the solution/water is heated in its way from the bottom of the vessel to the top. In the discharging process instead tube heat exchangers having tubes located in a zigzag fashion with long horizontal tubes are used in the reactors. The slave reactor 102 works only in discharging and thus requires only an inner heat exchanger which thus is a tube heat exchanger. In the charging step in the reactor the solution will then be heated in a closed space from which no vapor can be liberated. The solubility increases what avoids crystal formation. Only when the solution leaves the distribution pipe to flow over the surface enlarging means vapor can be liberated and then crystals can be formed. The corresponding process made in an inner heat exchanger would imply a risk for accumulation of salt crystals on the hot surfaces of the heat exchanger. In discharging in the reactor the heat exchanger is cooled what would give an obvious risk of crystal being formed in a closed plate heat exchanger. In an open tube heat exchanger inside the reactor the solution is cooled and is at the same type exposed to water vapor. Thereby, absorption of water and cooling are simultaneously made so that crystals cannot be easily formed in spite of the cooling.

An installation according to FIG. 7 for a house for a single family in the Mediterranean area built from light-weight concrete and having an area of 200 m² can require a solar panel area of 25 m², a storage capacity of 50 kWh cooling or 65 kWh heat. The maximum charging power is 15 kW and maximum cooling power is 6 kW. The thermo-chemical accumulator comprising a main unit and a slave unit can have a diameter of about 800 mm and a height of 1800 mm inclusive thermal isolation.

In FIG. 8 a thermo-chemical accumulator comprising a main unit 91 and a slave unit 92 according to in FIG. 7 is shown in greater detail, the main unit having a reactor 95 built substantially as shown in FIG. 6. The heating jacket 64 around the pump 66 and around the conduit 64' from the pump in the main reactor 95, and the outer heat exchanger 67 and the inner heat exchanger 71 should be observed. Since the main unit 91 in discharging only provides heating to the tap-water heater through the inner heat exchanger 71, this heat exchanger can be made small, located in the top portion of the reactor 95, comprising typically a plurality of substantially horizontal pipe sections connected in series and/or parallel in some zigzag pattern. Typically only a few kW are required. The main power is transferred in the outer heat exchanger 67 in charging in which the power can typically amount to 15 kW. The slave evaporator 103 is constructed similarly to the main condenser/evaporator 98 and comprises a pump 107, a distribution pipe 108 and surface enlarging means 109, the surface enlarging means being located at the top of the inner space directly below the distribution pipe. The heat exchanger 104 of the slave evaporator is an outer, plate heat exchanger dimensioned for 6 kW cooling power, this heat exchanger only cooling the condensed sorbate pumped by the pump 107 from the bottom part of the evaporator to the distribution bar. The slave reactor 102 which only works in discharging has a large zigzag type tube heat exchanger 102' which has a capacity of about 8 kW and is placed inside the slave reactor. This heat exchanger acts as well as a surface enlarging means receiving solution from a distributing tube 110 as pumped from the bottom of the slave reactor by a pump 111. A two-way valve 112 is connected in the conduit between the pump and the distributing tube and is for the normal state, in discharging set to let the solution from the bottom only pass to the distribution bar. The other outlet of the valve is through a conduit connected to an inlet of the pump 66 of the main reactor, so that the valve when changing its setting allows that consumed solution is pumped away, into the main reactor 95. Inlet of hot saturated solution from the bottom of the main reactor is made through a conduit 113 having an on/off valve 114, both having a jacket 115 in which hot water from the inlet valve 63 passes. In the slave evaporator 103 only water is consumed. New water is fed through a conduit 116 from the main condenser/evaporator which ends at a two-way valve 117 connected in the conduit from the pump 119 to the heat exchanger 99 of the main condenser/evaporator 98. A conduit 117' connects the bottom space of the main condenser/evaporator to the top side of the main reactor 95 through an on/off valve 118, the main condenser/evaporator being placed above the main reactor 95. For a proper setting of the valve 117 the pump 107 of the slave evaporator can pump water which is possibly "contaminated" by the substance back to the main condenser/evaporator. For an open valve 118 such "contaminated" residual water can be tapped from the main condenser/evaporator into the main reactor, this valve being normally closed.

The contamination comprises rests of the active salt or salts which in charging accompany the flow of gas past the gas filter and are collected in the water. If this continues for many cycles the vapor pressure of the water will be reduced and the cooling temperature will increase and the temperature of the hot tap water will be lowered. Tapping condensed water is thus made when the system has been discharged and thus contains a small quantity of water in the main condenser/evaporator 98, e.g. each tenth cycle.

The main condenser/evaporator 98 has the pump 119 pumping water from the bottom of the space inside the condenser/evaporator through a conduit heated by the outer heat exchanger 99 similar to the heat exchanger 104 of the slave evaporator but having a larger capacity to a distribution tube 120 at the top, from which the water flows over surface enlarging means 121 also at the top down to the bottom of the condenser/evaporator in the charging step for being vaporized. The gas connection 73 of the main reactor 95 is connected to the top part of the condenser/evaporator, this not being visible in FIG. 8. A similar gas conduit or connection 122 connects the slave reactor 102 and the slave evaporator 103 with each other.

A set of four two-way valves 123, 124, 125, 126 are connected in the conduits connecting the outdoor cooler and the room coolers/heaters to the slave reactor and the slave evaporator. For proper settings of these valves, for cooling in summer time, the outdoor cooler is connected to the heat exchanger 102' of the slave reactor and the room coolers/heaters to the heat exchanger 104 of the slave evaporator. For delivering heating in the cold season, the valves are instead set so that the outdoor cooler is connected to the heat exchanger of the slave evaporator and the room coolers/heaters are connected to the heat exchanger of the slave reactor.

Generally it can be observed that a plurality of combination possibilities exist, both including large installations working only with a solid substance or substances in a solid-liquid-phase transition according to the discussion above and small installations based on substances for which the same type of phase transition is used. It is up to the user to select the type of system which best solves his air conditioning needs considering the size, function and cost of the system. The process described herein in which substances are used which in the temperature range of interest has a phase transition between a solid and a liquid state constitutes an important contribution to the possibility of commercially using solar energy for air-conditioning purposes.

The chemical heat pump as described herein is not restricted to the use of solar energy but can use any heat source, in particular low-grade heat sources which provide heat at not too high temperatures. Also the cooling or heating generated by the chemical heat pump is not restricted to cooling or heating houses but can be used anywhere where there is a need for for example refrigeration such as in cool boxes or bags and refrigerators and in motorcars for air-conditioning using heat dissipated from the engine.

A thermo-chemical accumulator as described above is an elaborate solar driven cooling heat pump which in fact is a complete chemical heat pump which can provide the needs of hot tap-water, comfort cooling and heating for a house all days of the year. It provides in a single unit both an accumulation of heat and conversion of mostly low-grade heat to heating and cooling. The unit accommodates all valves and circulation pumps and control processor for the installation in a house and only occupies a small part of the floor area in the house.

What is claimed is:

1. A chemical heat pump comprising an active substance located in a first space and a volatile liquid, the vapor phase of which in a discharging step is absorbed by the active substance at a first temperature and in a charging step is desorbed by the active substance at a second higher temperature, the active substance having at the first temperature a solid state from which the active substance when absorbing the vapor phase of the volatile liquid directly partially passes to a liquid state or solution phase and having at the second temperature a liquid state or existing in a solution phase, from which the active substance when in the charging step desorbing the volatile liquid directly partially passes to a solid state, the vapor phase of the volatile liquid, in the charging step, after being desorbed by the active substance being condensed to a liquid phase in a second space, which through a first conduit is in fluid connection with the first space, and the liquid phase of the volatile liquid being, in the discharging step, converted to the vapor phase while the active substance absorbs the vapor phase, a first heat exchanger having a surface in the first space for maintaining, in the discharging step when the active substance successively passes from a solid to a liquid state while absorbing the volatile liquid, the active substance in a solid state and liquid state at the first temperature, characterized by separation means in the first space to separate the active substance in the solid state from the active substance in the liquid state or solution phase and distribution means to make the separated active substance in the liquid state or solution phase pass in contact with said surface of the first heat exchanger and the active substance in the solid state.

2. A chemical heat pump according to claim 1, characterized in that the separation means comprise a net or filter enclosing at least part of said surface of the first heat exchanger.

3. A chemical heat pump according to claim 2, characterized in that the separation means comprise a net enclosing at least a low part of said surface, a compartment being formed below a bottom of the net for receiving the active substance in the liquid state or solution phase.

4. A chemical heat pump according to claim 3, characterized in that the net is attached to walls of the first space.

5. A chemical heat pump according to claim 2, characterized in that the separation means comprise a filter arranged at a top part of said surface, the filter dividing the first space in two compartments to allowing vapor of the volatile liquid pass between a region at said surface and the conduit.

6. A chemical heat pump according to claim 1, characterized in that the distribution means comprise a pump coupled to a distributor located at the top of said surface to distribute the active substance in the liquid state or solution phase over a top portion of the first heat exchanger.

7. A chemical heat pump according to claim 6, characterized in that the distributor comprises a tube having openings.

8. A chemical heat pump according to claim 1, characterized in that the first heat exchanger comprises an inner part and an outer part, the inner part having said surface and the outer part exchanging heat with the active substance in a liquid state or solution phase directly before passing through the distribution means.

9. A chemical heat pump according to claim 1, characterized by a second heat exchanger and distribution means for the second space to make the volatile liquid in the liquid phase in the second space pass the second heat exchanger to be then distributed in the second space.

10. A chemical heat pump according to claim 9, characterized in that the distribution means comprise a pump coupled to a distributor located at the top of said surface of the second heat exchanger.

11. A chemical heat pump according to claim 10, characterized in that the distributor comprises a tube having openings.

12. A chemical heat pump according to claim 1, characterized in that the second space is located above first space and the bottom of the second space being in fluid connection with the top of the first space through a third conduit having a valve.

13. A chemical heat pump according to claim 1, characterized in that the bottom part of the second space is in fluid connection with the first space through a third conduit through which the volatile liquid in the fluid phase can be transferred to the first space to remove possible active substance from the second state.

14. A chemical heat pump according to claim 1, characterized by a third space and a fourth space being through a second conduit in fluid connection with each other, the third space being arranged to intermittently receive the active substance in the liquid state or solution phase at the second temperature from the first space and to return to the first space the active substance in a liquid state or solution phase, the fourth space being arranged to intermittently receive the volatile liquid in the liquid in the liquid phase from the second space.

15. A chemical heat pump according to claim 1, characterized in that the active substance comprises a metal salt which in its solid state contains crystal water and the volatile liquid comprises water, the metal salt being selected to liberate heat when absorbing water vapor.

16. A chemical heat pump according to claim 15, characterized in that the metal salt is selected to be dissolved in water liberating heat.

17. A chemical heat pump according to claim 1, characterized in that the active substance comprises a salt selected among calcium chloride, calcium bromide, magnesium chloride, magnesium bromide, lithium chloride, zinc dichloride and sodium hydroxide.

18. A method for cooling and/or heating comprising that an active substance in discharging is made to absorb a vapor phase of a volatile liquid at a first temperature to produce discharged active substance being in liquid state or solution phase and in charging to desorb the vapor phase of the volatile liquid at a second higher temperature to produce charged active substance being in a solid state, the vapor phase being separately condensed to produce condensed liquid and allowed to then be absorbed by the charged active substance, characterized in that the charged active substance is separated from the discharged active substance, the discharged active substance being distributed over a heat exchanging surface and over the charged active substance.

19. A method according to claim 18, characterized in that in the absorbing or desorbing of the volatile liquid by the active substance that portion of the active substance which exists in a liquid state or a solution phase is made to come in contact with the part of the active substance which exists in a solid state.

20. A chemical heat pump comprising an active substance and a volatile liquid, the vapor phase of which in discharging is absorbed by the active substance at a first temperature to produce discharged active substance and in charging is desorbed by the active substance at a second higher temperature to produce charged active substance, the active substance having at the second temperature a liquid state or existing in a solution phase, the vapor phase of the volatile liquid in charging after being desorbed by the active substance being condensed to a liquid phase, and the liquid phase of the volatile liquid being, in the discharging step, converted to the vapor phase while the active substance absorbs the vapor phase, characterized by a first space and a second space being through a first conduit in fluid connection with each other, and a third space and a fourth space being through a second conduit in fluid connection with each other, the first space containing the active substance desorbing the vapor phase at the second temperature to produce charged active substance, the second space containing the volatile liquid being condensed from the vapor phase, the third space being arranged to intermittently receive active substance having the second temperature from the first space and cooling it the first temperature, the fourth space being arranged to intermittently receive the volatile liquid in the liquid phase from the second space and making the received volatile liquid in the liquid phase be evaporated to produce vapor in equilibrium with the charged active substance in the third space, the charged active substance in the third space absorbing the vapor to produce discharged active substance, and the discharged active substance being intermittently transferred to the first space to become charged active substance.

* * * * *